United States Patent
Shyu (10) Patent No.: US 8,065,409 B2
(45) Date of Patent: *Nov. 22, 2011

(54) METHOD OF LABELING ALARMS TO FACILITATE CORRELATING ALARMS IN A TELECOMMUNICATIONS NETWORK

(75) Inventor: Jackson Shyu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1078 days.

This patent is subject to a terminal disclaimer.

(21) Appl. No.: 11/061,070

(22) Filed: Feb. 18, 2005

(65) Prior Publication Data

US 2005/0166099 A1 Jul. 28, 2005

Related U.S. Application Data

(63) Continuation of application No. 10/057,481, filed on Jan. 22, 2002, now Pat. No. 6,862,698.

(51) Int. Cl.
*G06F 15/173* (2006.01)
*G06F 11/00* (2006.01)

(52) U.S. Cl. ............. 709/224; 714/25; 714/38; 714/47; 714/57

(58) Field of Classification Search ................ 709/224
See application file for complete search history.

(56) References Cited

U.S. PATENT DOCUMENTS

| | | |
|---|---|---|
| 5,157,667 A | 10/1992 | Carusone, Jr. et al. |
| 5,253,184 A | 10/1993 | Kleinschnitz |
| 5,295,139 A | 3/1994 | Palmer |
| 5,309,448 A | 5/1994 | Bouloutas et al. |
| 5,325,522 A * | 6/1994 | Vaughn ............................. 707/1 |
| 5,375,070 A | 12/1994 | Hershey et al. |
| 5,408,218 A | 4/1995 | Svedberg et al. |
| 5,473,596 A | 12/1995 | Garafola et al. |
| 5,483,637 A | 1/1996 | Winokur et al. |

(Continued)

FOREIGN PATENT DOCUMENTS

EP 0 909 056 4/1999

(Continued)

OTHER PUBLICATIONS

"Alarm Correlation Engine (ACE)", IEEE 1998, Peng et al., pp. 733-742.*

(Continued)

*Primary Examiner* — Phuoc Nguyen
*Assistant Examiner* — Kishin G Belani
(74) *Attorney, Agent, or Firm* — Hickman Palermo Truong & Becker LLP (57) ABSTRACT

A method for generating compressed correlation key values for use in correlating alarms generated by network elements in a telecommunications network is disclosed. An alarm message generated by a network element is received. A context value in the alarm message is identified. A table that associates context values to correlation key value formulas is maintained. A formula specifying how to generate the correlation key value is retrieved from the table. Each formula may specify, for an associated context value, one or more ordinal positions of fields in the alarm message, a concatenation of which yields the correlation key value. The correlation key value is created based on the formula. A unique ordinal number is generated to represent the correlation key value, which acts as a context key. The alarm message and correlation key value are sent to an external system for use in correlating alarms.

30 Claims, 6 Drawing Sheets

U.S. PATENT DOCUMENTS

| | | | |
|---|---|---|---|
| 5,495,470 A | 2/1996 | Tyburski et al. | |
| 5,594,861 A | 1/1997 | Jonsson et al. | |
| 5,636,204 A | 6/1997 | Mizuno et al. | |
| 5,636,206 A | 6/1997 | Amemiya et al. | |
| 5,646,864 A | 7/1997 | Whitney | |
| 5,659,540 A | 8/1997 | Chen et al. | |
| 5,734,697 A * | 3/1998 | Jabbarnezhad | 379/14.01 |
| 5,737,319 A | 4/1998 | Croslin et al. | |
| 5,748,098 A | 5/1998 | Grace | |
| 5,768,501 A | 6/1998 | Lewis | |
| 5,771,274 A | 6/1998 | Harris | |
| 5,864,662 A | 1/1999 | Brownmiller et al. | |
| 5,922,051 A | 7/1999 | Sidey | |
| 5,926,462 A | 7/1999 | Schenkel et al. | |
| 5,933,416 A | 8/1999 | Schenkel et al. | |
| 5,946,373 A | 8/1999 | Harris | |
| 5,949,759 A | 9/1999 | Cretegny et al. | |
| 6,000,045 A | 12/1999 | Lewis | |
| 6,012,152 A | 1/2000 | Douik et al. | |
| 6,046,988 A | 4/2000 | Schenkel et al. | |
| 6,052,722 A | 4/2000 | Taghadoss | |
| 6,072,777 A | 6/2000 | Bencheck et al. | |
| 6,115,362 A | 9/2000 | Bosa et al. | |
| 6,118,936 A | 9/2000 | Lauer et al. | |
| 6,124,790 A | 9/2000 | Golov et al. | |
| 6,154,129 A | 11/2000 | Kajitani et al. | |
| 6,167,448 A * | 12/2000 | Hemphill et al. | 709/224 |
| 6,205,563 B1 | 3/2001 | Lewis | |
| 6,243,746 B1 | 6/2001 | Sondur et al. | |
| 6,253,243 B1 | 6/2001 | Spencer | |
| 6,253,339 B1 | 6/2001 | Tse et al. | |
| 6,263,455 B1 * | 7/2001 | Bannister | 714/25 |
| 6,271,845 B1 | 8/2001 | Richardson | |
| 6,349,333 B1 | 2/2002 | Panikatt et al. | |
| 6,356,885 B2 | 3/2002 | Ross et al. | |
| 6,393,386 B1 | 5/2002 | Zager et al. | |
| 6,456,306 B1 | 9/2002 | Chin et al. | |
| 6,513,129 B1 * | 1/2003 | Tentij et al. | 714/4 |
| 6,601,185 B1 | 7/2003 | Bass et al. | |
| 6,732,153 B1 * | 5/2004 | Jakobson et al. | 709/206 |
| 7,039,921 B2 | 5/2006 | Shah et al. | |
| 7,299,277 B1 * | 11/2007 | Moran et al. | 709/224 |
| 7,409,676 B2 | 8/2008 | Agarwal et al. | |
| 2001/0014886 A1 | 8/2001 | Ross et al. | |
| 2001/0039577 A1 | 11/2001 | Barkai et al. | |
| 2002/0116485 A1 | 8/2002 | Black et al. | |
| 2003/0046582 A1 | 3/2003 | Black et al. | |
| 2003/0061550 A1 | 3/2003 | Ng et al. | |
| 2003/0195959 A1 | 10/2003 | Labadie et al. | |
| 2004/0123293 A1 | 6/2004 | Johnson | |
| 2005/0015667 A1 | 1/2005 | Aaron | |
| 2005/0099419 A1 | 5/2005 | Castonguay et al. | |
| 2005/0207376 A1 | 9/2005 | Ashwood-Smith et al. | |
| 2005/0256956 A1 | 11/2005 | Littlefield et al. | |
| 2007/0121486 A1 | 5/2007 | Guichard et al. | |
| 2008/0091803 A1 | 4/2008 | Liu | |
| 2008/0288821 A1 | 11/2008 | Aaron | |

FOREIGN PATENT DOCUMENTS

| | | |
|---|---|---|
| WO | WO 02/21774 A1 | 6/2001 |

OTHER PUBLICATIONS

Du, W., et al., Practical Alarm Suppression of End-to-End Virtual Circuit Connections, www.dvo.ru/bbc/pdota/vol1.ps1261.pdf, pp. 1-7, Jun. 27, 2000.

3$^{rd}$ Generation Partnership Project: Technical Specification Group Services and System Aspects; 3G Fault Management (Release 1999), 3G TS 32.11 v3.0.1, 3$^{rd}$ Generation Partnership Project, pp. 1-20, Mar. 2000.

PDPTA '2000 Conference Program, www.ashland.edu/~iaiwa/conferences/2000/Schedules/pdpta.txt, pp. 1-45, date unknown.

Jakobson et al., "Alarm Correlation—Correlating multiple network alarms improves", IEEE network, Nov. 1993.

Canada 2,565,528, Office Action dated Mar. 4, 2009, 2 pgs.

Canada 2,565,528, Current Claims, dated Jul. 7, 2009, pp. 18-23.

* cited by examiner

INTELLIGENCE TABLE

| | |
|---|---|
| ssngSyslogLinkStateChanged | <1> + <2> + <13> |
| ssngLinkFailed | "LinkFail" + <1> + <2> + <15> + <cust_ID> |
| | |
| 306N | |
| | |

METHOD OF LABELING ALARMS TO FACILITATE CORRELATING ALARMS IN A TELECOMMUNICATIONS NETWORK

RELATED APPLICATIONS AND CLAIM OF PRIORITY

This application is a continuation of and claims priority to U.S. patent application Ser. No. 10/057,481 entitled METHOD OF LABELING ALARMS TO FACILITATE CORRELATING ALARMS IN A TELECOMMUNICATIONS NETWORK, filed on Jan. 22, 2002, now U.S. Pat. No. 6,862,698 the contents of which is hereby incorporated by reference in its entirety for all purposes.

FIELD OF THE INVENTION

The present invention generally relates to data processing in the field of network management for data networks. The invention relates more specifically to a method and apparatus for generating labels to facilitate correlating alarms in a telecommunications network as part of network management.

BACKGROUND

The data networks that are deployed by service providers or large enterprises often comprise hundreds or thousands of network devices. A network device may comprise one or more network elements, which are entities like modules, ports, slots etc. The network devices and their corresponding network elements may be managed by one or more network management systems, such as an operational support system (OSS), which are implemented using computer application programs that can communicate with the network devices. OSS applications are either obtained from commercially available sources or developed internally by telecommunications service providers.

When a network device detects a fault or error within itself or relating to one of its elements or relating to links to another device or elements, the network device generates an alarm message ("alarm" herein) and sends it to the network management system. To enable the network management system to detect fault conditions as they occur ("in real time"), some network elements are even designed and configured to generate and send such alarms repeatedly, until the fault or other causative condition is resolved or acknowledged. Such network devices may include routers, LAN switches, WAN switches, edge devices such as access routers, or other network elements, and system elements such as UNIX servers, etc.

Although this approach has the benefit of ensuring that alarms are known until they are resolved, it also creates certain management problems. In particular, isolating new alarms is difficult, because the processing required to uniquely identify an alarm is generally equal to the total alarm frequency multiplied by the number of network elements and multiplied by the length of the time period of observation. For example, one empirical study conducted by the inventor hereof identified, in a one-month observation period involving 9,000 network elements, over two million alarms representing only 129 unique alarm conditions.

Identifying the unique alarms requires extensive processing power and specialized knowledge of the syntax and semantics of the alarm messages. Further, these processing requirements, and the associated cost of analyzing the alarm messages, multiplied by the number of different software versions or revisions running on each network element or system element, adds significantly to the total cost of maintaining an OSS for a network. The initial investment of a service provider in an OSS and the cost of upgrading or modifying an OSS are huge, and therefore it is less desirable to upgrade an OSS to read or parse new alarm types that are introduced from time to time.

Still another problem involves propagation of alarms among different network elements. A large network may have network devices from many different vendors. Each vendor may define a unique fault or alarm type and structure for its network devices when standard alarm types are deemed inadequate. When one device fails and generates an alarm, the device may communicate the alarm to a device from a different vendor, which generates a new alarm that is semantically identical to the original alarm but that has a different syntax. As a result, in existing networks, many different fault management processing modules have been deployed as accessory products or external systems. These approaches have been taken because the structure and internal details of the alarms or fault events are not well understood. The owner or operator of the network may have difficulty in identifying the fault because the structure of the event or alarm is not well understood.

One approach to addressing the foregoing problems is correlating alarms based on a correlation key label. However, current alarm correlation approaches that use correlation labels have significant limitations. The key size is generally large and un-compressed. In a worst-case scenario, an uncompressed correlation key could be as large as the original correlated message, effectively doubling the size of alarm traffic. Also, the way each vendor generates the labels might not be unique across the heterogeneous network.

A related problem is that the different network devices from different vendors may communicate semantically identical alarms using different protocols such as SNMP, Log, XML, etc. Moreover, within a given protocol, different network devices may report alarms using different protocol messages. For example, two devices that both use SNMP to report alarms may use different SNMP traps to report alarms that are semantically identical.

Still another problem is that an OSS may receive thousands of the same kind of alarm messages that are semantically identical but reference different network devices or links. To determine which messages are semantically identical and reference the same fault condition, the OSS must parse and interpret the messages using extensive processing resources. Using a consistent trap type does not solve the problem. For example, assume that a fault condition is "Link Down" (a very common kind of fault) and that all SNMP devices of all vendors use the same kind of SNMP trap to report Link Down. Due to propagation of alarms along interconnected links, each Link Down trap message may include, nevertheless, different values for Node Name, IP Address, Link ID, etc., even when only one device is at fault. Therefore, extensive parsing and correlation is required at the OSS to isolate the source of the fault.

Furthermore, for the SNMP protocol, there is no way to formally define a correlation key value or index value in a MIB, making the fault management task less organized, which is undesirable. For example, the same 'INDEX' constructs used to represent key scalar or tabular attributes in an SNMP MIB cannot be used to represent the key value of Trap in the MIB.

Based on the foregoing, there is a clear need in this field for an improved method of generating correlating alarm labels for the alarms generated by network management systems.

There is a specific need for a way to uniquely identify semantically identical alarms that are generated from different devices or devices' elements in a manner that is consistent across devices from different vendors.

There is also a need for a way to uniquely identify semantically identical alarms that are generated from different devices using different protocols or different message types within a given protocol.

There is also a need to provide a way to identify alarms without adversely impacting the speed of an OSS or similar system that is carrying out fault correlation.

There is also a need for an approach that provides a compressible correlation key to preserve network bandwidth and provide better performance than uncompressed one.

SUMMARY OF THE INVENTION

The foregoing needs, and other needs and objects that will become apparent from the following description, are achieved in the present invention, which comprises, in one aspect, a "generic" method of generating a label for use in correlating alarms emitted by network elements or system elements in a telecommunications network. The disclosed method is independent of the protocol used by a particular device vendor. An alarm message generated by a network element or system element of the telecommunications network is received. A context value in the alarm message is identified. A table that associates context values to internal correlation key value formulas is maintained. A unique external correlation key value or label is generated for the internal correlation key value. The alarm message and correlation key value are sent to an external system for use in correlating alarms.

In one feature, the alarm message is an SNMP trap and the label value is generated by a formula, which specifies a concatenation of the SNMP varbinds in the received trap that will be used in the label, in additional to some external IP header information, such as the source IP address of the node that generated the trap.

In another feature, the external system is an OSS of a telecommunications service provider. The table may be stored at a gateway or proxy that is logically located in the telecommunication network between the network element or system element and an OSS system of a telecommunications service provider.

In another feature for log or XML events, each formula in the table specifies, for an associated context value, one or more ordinal positions of fields or regular expressions which specify the method to extract the field in the alarm log, and in addition the IP header information which is received as part of the alarm log in the IP header of the alarm's log message that specifies the source IP address of the received log.

According to another feature, each formula in the table specifies, for an associated context value, one or more fields in the alarm message, a concatenation of which yields the internal correlation key value.

The internal correlation key offers a unique representation of the internal alarm message values and serves the same purpose of identifying unique alarms. The key may have any desired size in order for supporting networks of unlimited size. Use of a unique compressed external key offers surprising conservation of bandwidth, as a conventional internal correlation key can be quite large and expensive to transmit.

In yet another feature, each formula in the table further specifies one or more references to objects in an external database system. The formulas also may specify one or more references to programmatic procedures that are stored in an external database system. The formulas also specify a pattern matching procedure, in the form of a regular expression, to extract one or more ordinal positions of fields from the source alarms.

In one specific approach, wherein each formula in the table specifies, for an associated context value, one or more ordinal positions of a plurality of fields in the alarm message, or a pattern to match, and one or more references to external database indexes or to programmatic procedures that are stored in an external database system, and wherein a concatenation of the fields and a result value from execution of the programmatic procedures yields the internal correlation key value. As another feature, the table is stored at a gateway that is logically located in the telecommunication network between the network element or system element and an OSS of a telecommunications service provider; each formula in the table specifies, for an associated context value, one or more ordinal positions of fields in the alarm message and one or more references to objects in an external database system that is accessible to the gateway; and a concatenation of the fields and objects yields the internal correlation key value.

Sending the alarm message and external correlation key value or label may involve sending an SNMP message to an OSS that includes a complete SNMP object carrying the alarm message and the correlation key value. In another feature, an XML file is sent to an OSS that includes the alarm message and the external correlation key value or label identified by unique XML tags.

In one embodiment, a correlation key field is defined in each alarm message that is generated by an alarm module of a network element or system element. When alarm messages are generated using SNMP, for example, the correlation key is a value formed by the concatenation of selected values, specified according to one of the formulas, which uniquely identify a network element. For example, a correlation key may comprise a concatenation of a hostname value, slot number value, and process identifier. The correlation key is identified in an SNMP MIB by a unique object identifier. The correlation key also may be specified in an XML tag.

A proxy server is provided to gather alarms from network elements and system elements that cannot self-generate correlation keys. The proxy server generates one or more new alarms on behalf of the network elements and system elements, and each alarm that is generated include a correlation key of the type defined herein that corresponds to the original alarm received by the proxy server. A string comparison operation in an OSS parsing module is provided to identify alarms having a designated correlation key.

In this arrangement, benefits accrue in that the parsing module to extract correlation keys may be written once and thereby reduce the cost of the OSS. The potential for erroneous interpretation of alarms is reduced because the correlation keys and proxy servers may be tested and supported by the same party that creates, sells, services or maintains the corresponding network elements and system elements. The processing efficiency of the OSS in parsing unique error messages is greatly enhanced and simplified using relatively simple string comparison operations.

Further, while in some approaches, the key size is as large as the original alarm, in the approach herein a label or key of approximately 64 bits may be used for all alarms generated in a very large network. Additionally, in past approaches, correlation key values have been limited to the content of the alarm received. The approach described herein offers integration with an external database and an extensible software method that is used to add or compute more instance information. For example, in one feature, a processing method can access reference documentation for alarms to provide a more detailed explanation and recommendation relating to an alarm that the alarm message itself cannot convey.

In another feature, a software function dynamically queries an instance identifier associated with the customer ID that identifies one or more external database indexes.

New alarms can be identified instantly as the label that is generated is a uniquely identified network instance. Any new label from events indicates a new type of alarm. Repeated label of the same value indicates an alarm that is known and is repeated either by alarm type and or by network instances.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for generating a correlation key value for use in correlating alarms emitted by network elements or system elements in a telecommunications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Alarm Correlation Approach Using Correlation Key Value

In one embodiment, in a method for generating internal correlation key values for use in correlating alarms generated by network elements in a telecommunications network, an alarm message generated by a network element or system element of the telecommunications network is received. A context value in the alarm message is identified using a lookup table having an entry for each supported alarm. A table that associates context values to correlation key value formulas is maintained. A formula specifying how to generate the correlation key value is retrieved from the table. A unique external correlation key value is created based on the formula. The alarm message and external correlation key value are sent to an external system, such as an OSS, for use in correlating alarms. The alarm message may be an SNMP message and the context value may be an SNMP context string. The table may be stored at a gateway that is logically located in the telecommunication network between the network element or system element and an OSS of a telecommunications service provider. Each formula in the table may specify, for an associated context value, one or more ordinal positions of fields in the alarm message, or a pattern from which the fields are extracted, a concatenation of which yields the correlation key value. A formula may reference objects or programmatic procedures in an external database system. Because the internal keys may be large, the external keys are generated to uniquely represent the internal keys.

In another embodiment, a correlation key field is defined in each alarm message that is generated by an alarm module of a network element or system element. When alarm messages are generated using SNMP, for example, the correlation key is a value formed by the concatenation of selected values that uniquely identify a network element. For example, a correlation key may comprise a concatenation of a hostname value, slot number value, and process identifier. The correlation key is identified in an SNMP MIB by a unique object identifier.

The correlation key also may be specified in an XML tag.

A proxy server is provided to gather alarms from network elements and system elements that cannot self-generate correlation keys. The proxy server generates one or more new alarms on behalf of the network elements and system elements, and each alarm that is generated include an external correlation key of the type defined herein that corresponds to the original alarm received by the proxy server. A comparison operation in an OSS parsing module is provided to identify alarms having a designated correlation key.

Embodiments are applicable to fault reporting by network elements or system elements. Network elements may comprise one or more routers, LAN switches, WAN switches, edge devices such as access routers, or other processing devices. System elements may comprise UNIX servers, workstations, printer servers, personal computers, or any other processing device that can report a fault. Embodiments are applicable to faults that are reported using alarm messages, events that are published to an event bus, SNMP traps, and other reporting mechanisms.

Figure 1A:
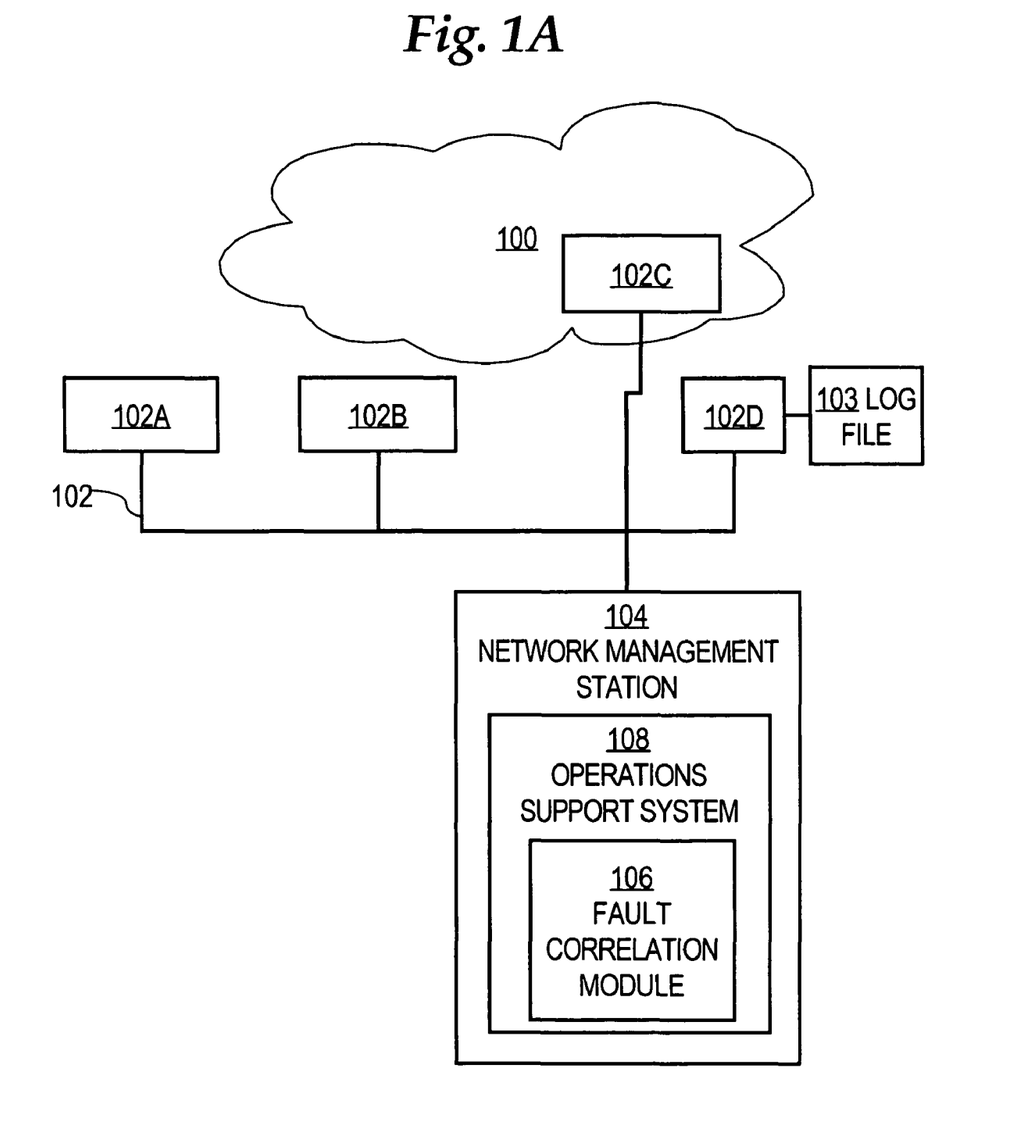
FIG. 1A is a block diagram of a network context in which fault correlation is carried out in a conventional approach.

FIG. 1A is a block diagram of a network context in which fault correlation is carried out in a conventional approach. A managed network 100 includes one or more local area networks or wide area networks, such as an example local area network 102. One or more network devices 102A, 102B, 102C, 102D participate in the local area network 102. Each of the network devices 102A, 102B, 102C, 102D maintains a log file 103 in which it writes records of alarms or fault conditions.

A network management station 104 is communicatively coupled to local area network 102, and in this position, the network management station can monitor events occurring in networks 100, 102. Network management station 104 is a workstation, personal computer, or similar device and executes an operations support system 108 having a fault correlation module 106. The fault correlation module 106 generally comprises one or more custom-written computer programs that interact with OSS 108 and networks 100, 102.

In operation, fault correlation module 106 periodically reads log file 103 and parses it to identify any alarms that are shown in the log file. Fault correlation module 106 may read log file 103 by, for example, issuing one or more SNMP requests, or a network element may send a log to a well-known port using an agreed-upon protocol. The owner or operator of the managed network or the OSS 108 creates the specific functions of fault correlation module 106 on a custom basis, based on extensive and specialized knowledge of the syntax and semantics of alarms that are generated by each of the network devices that are present in the managed network. Further, the functions carried out by fault correlation module 106 generally are limited to the domain of the managed network as it existed at the time that the fault correlation module is created. If the managed network is upgraded or changed, then the fault correlation module requires modification. Such modifications may require new parsing steps in fault correlation module 106, new programmatic logic in response to detection of new kinds of events, etc. Carrying out such modifications involves significant effort and is costly. Further, to carry out such updates, the OSS usually is required to shut down, which is undesirable.

Figure 1B:
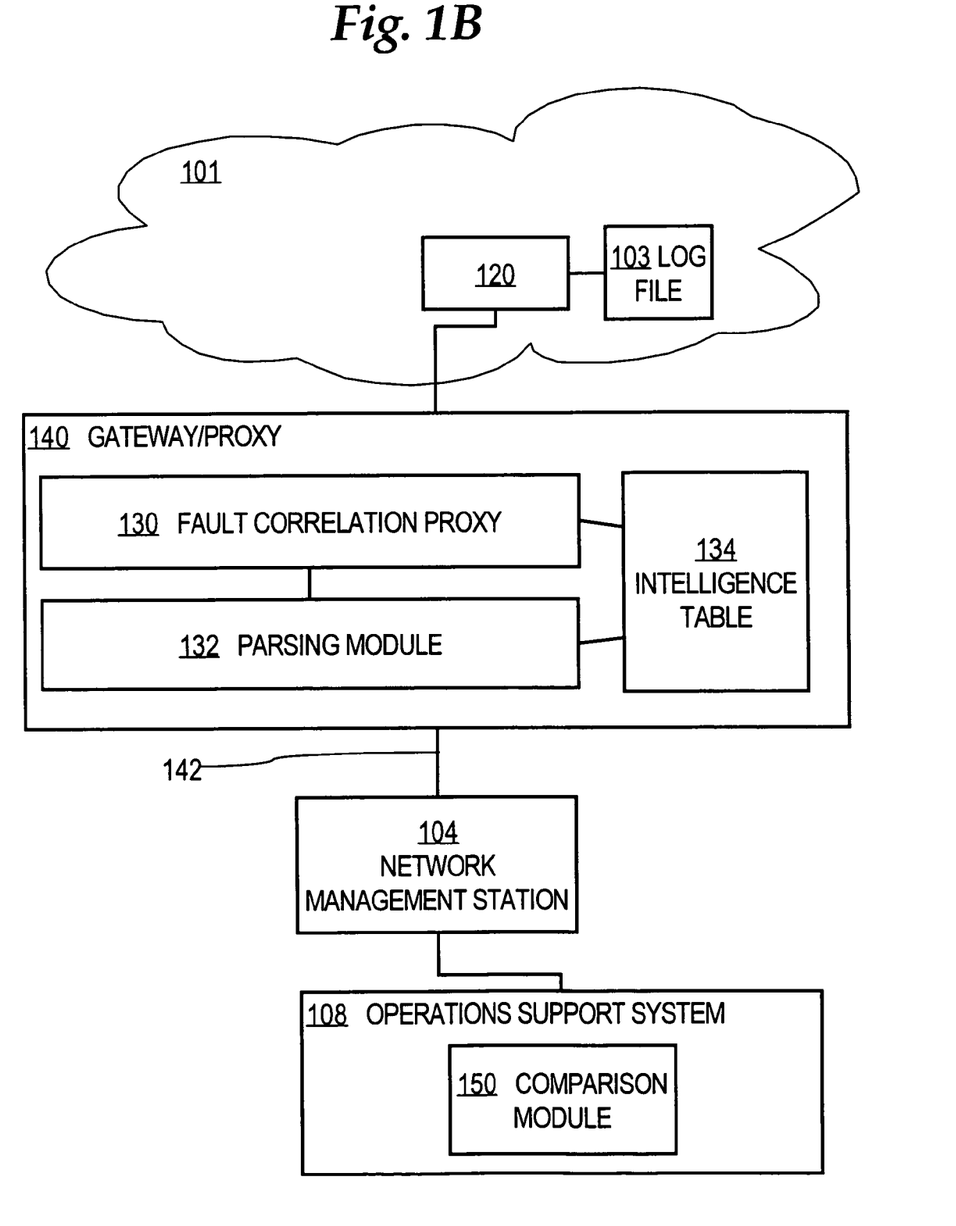
FIG. 1B is a block diagram of an example network context in which an embodiment may be used.

FIG. 1B is a block diagram of an example network context in which an embodiment may be used. A managed network 101 comprises at least one network element 120 that maintains a log file 103. Network element 120 may be one or more routers, switches, or other network devices. Network element 120 is communicatively coupled to other devices in network 101 and to a gateway 140 having a fault correlation proxy 130. The gateway 140 is further communicatively coupled, directly or indirectly through one or more intervening networks, to network management station 104. Network management station 104 executes an OSS 108 that includes a comparison module 150. Comparison module 150 carries out a string comparison, numeric comparison, bitwise comparison, or other comparison as appropriate to the data type of the keys and labels.

For purposes of illustrating a simple example, FIG. 1B shows one network device 120. In a practical system, however, managed network 101 may include any number of network devices, and may comprise one or more local area networks, wide area networks, metropolitan area networks, campus networks, or inter-networks.

Gateway 140 comprises a memory and disk work area for correlating alarms. Gateway 140 may be implemented as any suitable programmable device such as a UNIX workstation, LINUX-based computer, Microsoft Windows®-based computer, etc. Alternatively, gateway 140 may be implemented as a process that executes in network element 120, although this is considered less desirable because it burdens network element 120 with the processing requirements of generating alarm correlation keys. In these arrangements, gateway 140 acts as an alarm proxy server for network element 120 or for all of network 100.

Gateway 140 may be located at a central office of a service provider where one or more network elements are co-located, for example. This arrangement has the advantage of ensuring that real-time alarm correlation processes occur rapidly. Alternatively, gateway 140 may be co-located with OSS 108 either in a central office or another location.

In general, a network context of this arrangement functions as follows. Network element 120 detects a fault condition within itself, on one of its interfaces or links to other devices, or receives a fault message from another device. In response, network element 120 generates an alarm. In real time, fault correlation proxy 130 of gateway 140 intercepts the alarm and determines whether the alarm matches a known kind of alarm. If fault correlation proxy 130 recognizes the alarm, then the fault correlation proxy converts the alarm into an alarm message having a canonical format and tagged with the external correlation key value generated in a specific way as described herein.

Gateway 140 then sends the alarm message to network management station 104. In one embodiment, in real time, gateway 140 sends the alarm message with the external correlation key value by publishing the alarm message in an event using an event bus system. For example, gateway 140 and OSS 108 may be clients of a commercial event bus system, such as that available from TIBCO Software, Inc. Alternatively, the alarm message may be provided in an XML document or a message conveyed using SNMP or another messaging protocol.

OSS 108 receives the alarm message. Comparison module 150 of OSS 108 examines the correlation key value in the alarm message and determines whether it matches a previously received alarm message. If no match occurs, then OSS 108 processes the received alarm. Such processing may include reporting the alarm to an end user through a graphical user interface, logging the received alarm in a log file of OSS 108, executing a pre-defined program to carry out specified steps, etc.

Comparison module 150 represents an example mechanism with which OSS 108 may carry out alarm correlation. However, use of this particular mechanism is not critical and other known mechanisms may be substituted.

If operating system software or application program software at gateway 140 is upgraded, the upgrade process may update intelligence table 134 and may signal network management station 104 to reflect the update in its control memory without requiring NMS 104 to shut down.

In one embodiment, the correlation key value is a composite key providing a single field that is derived from values found in existing SNMP trap definitions. The correlation key value may vary depending on the nature of the received alarm. In one embodiment, fault correlation proxy 130 comprises a parsing module 132 and an intelligence table 134. Parsing module 132 determines what kind of alarm has been received from network element 120. Based on the results of parsing the received alarm, fault correlation proxy 130 looks up, in intelligence table 134, what values in the received alarm should be combined in what way to yield the internal fault correlation value.

Parsing module 132 may comprise one or more parsing processes that carry out required parsing using data from table 134. Each of the parsing processes is responsible for parsing a particular kind of alarm or event, or alarms or events from a particular kind of device. When an alarm is received, fault correlation proxy 130 selects one of the parsing processes based on information in the alarm. This arrangement enables fault correlation proxy 130 to process alarms having any format.

Figure 3:
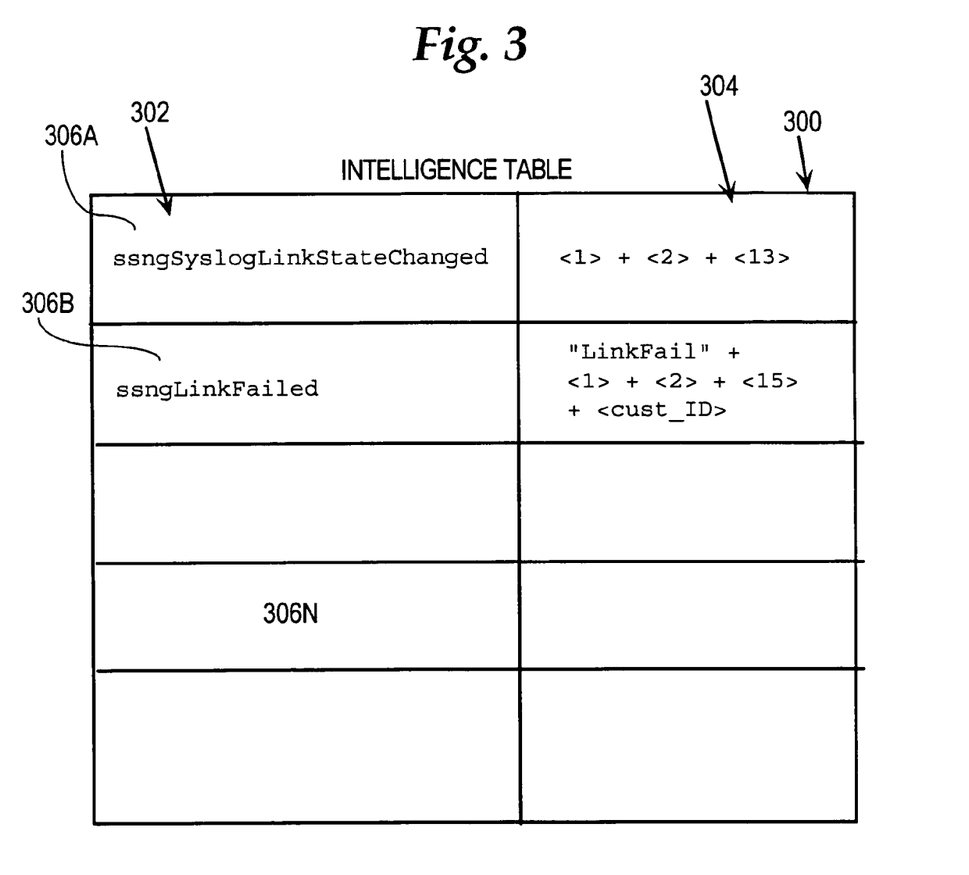
FIG. 3 is a block diagram of an intelligence table, in one embodiment.

FIG. 3 is a block diagram of an intelligence table, in one embodiment. Intelligence table 134 is implemented as a table stored in memory or mass storage accessible to gateway 140 that correlates fault types, as identified by context values, to formulas. As illustrated in FIG. 3, an intelligence table 300 may comprise a plurality of table entries 306A, 306B, 306N. For purposes of illustrating an example, FIG. 3 shows a small number of table entries, but a practical embodiment may include any number. Each table entry comprises values in a fault type column 302 and a formula column 304. Values in fault type column 302 identify kinds of faults and may comprise the concatenation of a trap name or alarm name and a type of a network element that generated the trap, and a name of a vendor of that network element. When SNMP is the messaging protocol, the context values may correspond to SNMP context strings.

The formulas in formula column 304 are mathematical and specify how to create a fault correlation value for the associated fault type by combining one or more values from within a received alarm. A formula may reference an external database index or procedure that can be executed to result in a value. In one alternative, the values referenced in the formulas may be MIB variable instance values that are embedded within a received alarm. The fault correlation proxy 130 may apply such a formula by extracting the instance values identified in the formula from the alarm, combining the values in the manner indicated in the formula. For example, in one embodiment, each formula is an arithmetic expression comprising integer values that identify ordinal positions of values in an SNMP context string.

As a specific example, assume that the received alarm is an SNMP trap that is defined as shown in Table 1.

TABLE 1

EXAMPLE SNMP TRAP

| SsngSyslogLinkStateChanged    TRAP-TYPE |
| --- |
| ENTERPRISE    svplus |
| VARIABLES    { |
| ssnglastSequenceNumber, |
| ssngNodeName, |
| ssngRouterIpAddr, |
| ssngTrapReason, |
| ssngTrapFacility, |
| ssngTrapSeverity, |
| ssngTrapMnemonic, |
| ssngTrapRepeatCount, |
| ssngTrapTimeStamp, |
| ssngParentDeviceName, |
| ssngParentDeviceIp, |
| ssngParentDeviceSlotNo, |
| ssngLinkID, |
| ssngState |
| } |
| DESCRIPTION " |
| Description of the trap goes here" |

Note that the trap syntax and notification syntax in SNMPv1 and SNMPv2, respectively, do not provide a way to index traps, alarms or notifications. Assume further that an entry 306A in the intelligence table 300 comprises the context string "ssngSyslogLinkStateChanged" in column 302 and the formula "<1>+<2>+<13>" in column 304. The values "<1>," "<2>," and "<13>" reference the first, second, and thirteenth ordinal positions of fields in an alarm identified by the associated context string. Thus, the formula indicates that the correlation key is generated by a string concatenation of the context string and the values "RouterA," "10.1.1.1," and "2/1/30."

If one of the fields specified in a formula is not present in the received alarm, then a value for that field is obtained by issuing a query to the network device that generated the received alarm. The query requests that network device to provide the then-current value for the field specified in the formula. The query may specify the needed value by providing the SNMP community string and the ordinal position as an offset within the trap named by the community string. Thus, when a received alarm message does not contain a needed value as specified in a formula, the needed value is obtained dynamically from the associated device, and may be obtained without knowing the name of the field. Alternatively, values may be obtained from static online user documents.

In another embodiment, a value for a formula may be obtained by a database query or other query to an external system. In this embodiment, the formula in the intelligence table comprises a reference to a database object, or to an external function or process that provides a value for the correlation key. For example, an entry in the intelligence table may comprise the context string "ssngSyslogLinkStateChanged" and the formula "<1>+<2>+<13>+<cust_ID>." The values "<1>," "<2>," and "<13>" reference the first, second, and thirteenth ordinal positions of fields in the associated context string. The value <cust_ID> is the name of an object in a database system that is accessible to gateway 140. Thus, the formula indicates that the correlation key is generated by a string concatenation of the context string, the values "RouterA," "10.1.1.1," "2/1/30" and the value of a database variable named <cust_ID>, or a value returned by a database stored procedure named <cust_ID>. Alternatively, the value <cust_ID> references an external function or process that generates a customer identifier, such as a function of an API of the OSS, a function of a dynamic linked library, etc. This approach enables gateway 140 to introduce a customer-specific or otherwise unique element into the correlation key value.

The correlation key value may be output by gateway 140 to network management station 104 and OSS 108 using an event bus, XML document or SNMP message. Use of XML provides the advantage that the correlation key value is multi-protocol. When an XML file is used, the correlation key value is carried in the file in a special tag that identifies the correlation key value as such. When SNMP is used, the correlation key value and the complete SNMP trap object are sent to the OSS 108 by a different trap message.

Figure 4:
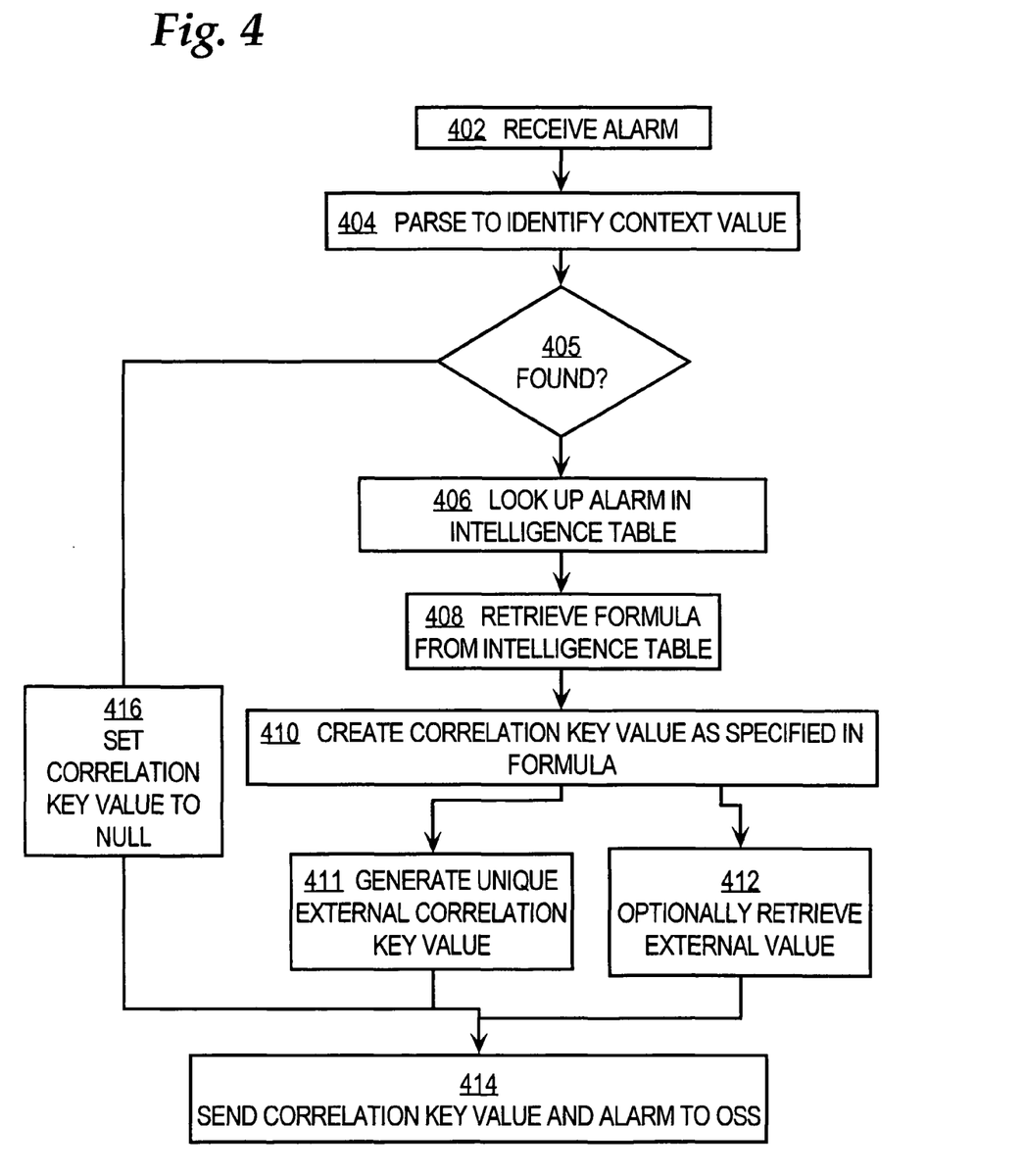
FIG. 4 is a flow diagram of a process of generating an alarm correlation value.

FIG. 4 is a flow diagram of a process of generating an alarm correlation value. The process of FIG. 4 may be implemented in whole or in part using one or more computer programs, routines, or other software elements that are executed by gateway 140 to provide the functions described herein.

In block 402, an alarm is received. For example, gateway 140 receives an alarm that has been generated by network device 120 and broadcast, published, or otherwise communicated to the gateway.

In block 404, the alarm is parsed. Parsing in block 404 involves examining field values of the alarm to determine which field carries a value that can be used as a context value for a table look-up. For example, when the alarm arrives in an SNMP message, the SNMP varbinds relating to context are identified in the alarm. Parsing may involve carrying out pattern matching on the varbinds. If the parsing operation of block 404 is unable to identify a value that can be used as a context value for table look-up, then control passes to block 416 in which a correlation key value for the alarm is set to NULL or to a flag value. The alarm is then passed to the OSS or another external system for further processing, as indicated in block 414.

If the parsing operation of block 404 results in identifying a known context field, then in block 406 the alarm is looked up in an intelligence table using the context value as a key. For example, when the alarm is received in an SNMP message, the context string is used as a key to carry out a table lookup in the intelligence table. In block 408, a formula is retrieved from an entry of the table that matches the context value.

In block 410, a correlation key value is created for the alarm as specified in the retrieved formula. In block 411, an external correlation key value is generated. In one approach, block 411 involves compressing the internal correlation key value. Example compression approaches include Hamilton's algorithm and applying a hash operation, such as Message Digest 5 (MD5). Compression may be carried out using a mapping that is maintained by gateway 140 in persistent storage, in a form similar to that of Table 2 below.

TABLE 2

EXAMPLE COMPRESSION MAPPING

| INTERNAL CORRELATION KEY VALUE | INDEX |
|---|---|
| ssngLinkFail, 10.1.1.1/1/30/20 | 1 |
| ssngLinkIDChange, 10.1.1.1/1/30/20 | 2 |
| ssngLinkIDChange, 10.1.1.2/1/30/20 | 3 |

If the formula specifies an external value or procedure, then in block 412 that external value or procedure is retrieved or executed. Control then passes to block 414 in which the alarm with the external correlation key value is then passed to the OSS or another external system for further processing.

The example of FIG. 4 is primarily applicable to SNMP traps. Processing of system log files containing alarms may be carried out using a process similar to that of FIG. 4, except that pattern matching is applied in block 404 to identify alarms.

Implementation Mechanisms—Hardware & Software Overview

Figure 2:
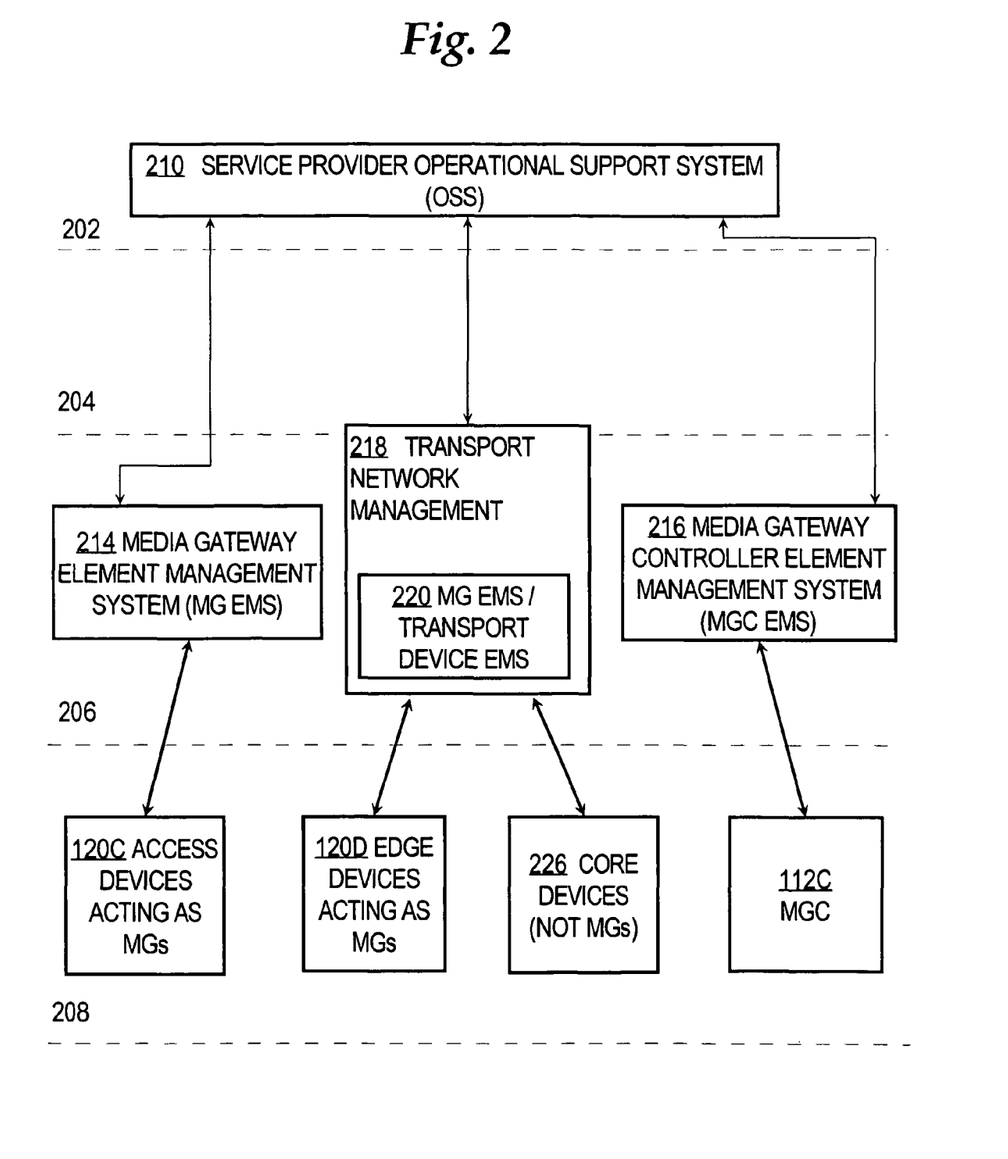
FIG. 2 is a block diagram of a network operations support system and its relationship to other logical elements of a network management system.

FIG. 2 is a block diagram of an OSS and its relationship to other logical elements of a network management system. The arrangement of FIG. 2 generally comprises a service management layer 202, network management layer 204, element management layer 206, and network element layer 208.

Network element layer 208 represents the logical position of network devices in a network. Network element layer 208 may comprise, for example, one or more access devices acting as media gateways 120C; one or more edge devices acting as media gateways 120D; one or more core devices 226, which do not act as MGs; and one or more media gateway controllers 112C.

Element management layer 206 comprises components that manage elements in network element layer 208. Typically, the components of element management layer 206 comprise software application programs that are executed on workstations that are communicatively coupled to the elements of layer 208 or to a network in which they participate. In one example arrangement, layer 206 comprises a media gateway element management system 214 that manages MGs; a transport network management system 218 that manages edge devices 120D and core devices 226; and a media gateway controller element management system 216 that manages MGC 112C.

Service management layer 202 comprises an operational support system (OSS) that provides supervisory level control of the MG EMS 214, transport network management system 218, and the MGC EMS 216. Known OSS solutions from, for example, Telcordia or other vendors provide service order entry, service definition, and service provisioning functions.

Figure 5:
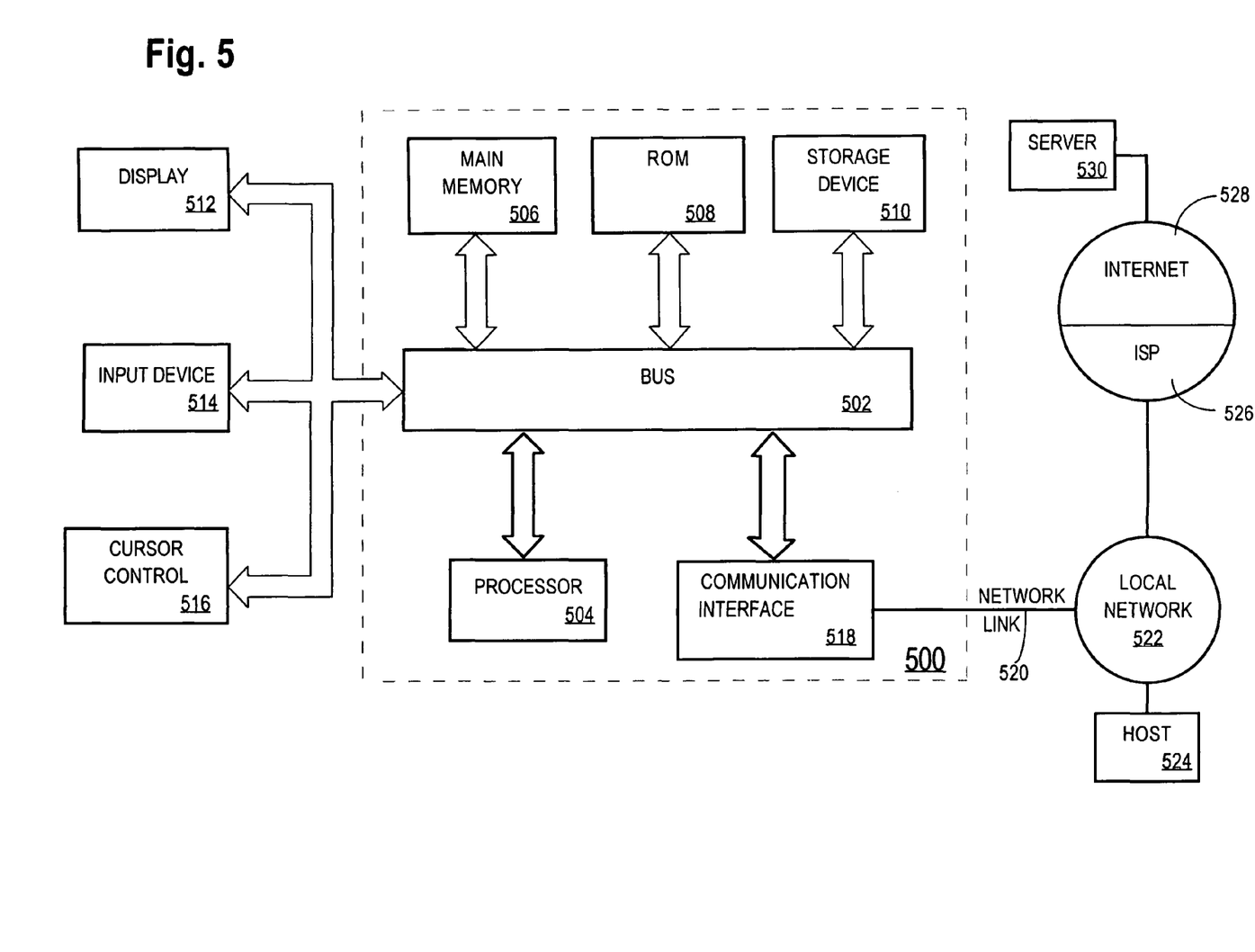
FIG. 5 is a block diagram that illustrates a computer system upon which an embodiment may be implemented.

FIG. 5 is a block diagram that illustrates a computer system 500 upon which an embodiment of the invention may be implemented.

Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for generating network alarms using a correlation key approach. According to one embodiment of the invention, generating network alarms using a correlation key approach is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions.

The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for generating network alarms using a correlation key approach as described herein.

Processor 504 may execute the received code as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for generating an external correlation key value for use in correlating alarms emitted by network elements or system elements in a telecommunications network, the apparatus comprising a memory storing instructions which, when processed by one or more processors, causes:

receiving an alarm message generated by a network element or system element of the telecommunications network, wherein the alarm message is generated in response to one or more alarm conditions;

parsing the alarm message that is generated in response to the one or more alarm conditions to identify a particular context value in the alarm message;

after receiving and parsing the alarm message, using the particular context value in the alarm message as a key to retrieve, from a table that associates context values to internal correlation key value formulas, a particular internal correlation key value formula specifying how to generate, by using two or more values contained in the alarm message, an internal correlation key value for the alarm message;

after receiving and parsing the alarm message, using the particular internal correlation key value formula to generate, using information contained in the alarm message, a particular internal correlation key value for the alarm message;

generating a particular external correlation key value for the alarm message based on the particular internal correlation key value; and sending both (a) data that represents the alarm message and (b) the particular external correlation key value to a network management system, wherein the external correlation key value allows the alarm message to be properly correlated.

2. An apparatus as recited in claim 1, wherein the alarm message is an SNMP message, the context value is an SNMP context string, and the particular external correlation key value is an ordinal number.

3. An apparatus as recited in claim 1, wherein the table is stored at a gateway that is logically located in the telecommunication network between the network element or system element and an Operational Support System of a telecommunications service provider.

4. An apparatus as recited in claim 1, wherein each formula in the table specifies, for an associated context value, one or more ordinal positions of fields in the alarm message.

5. An apparatus as recited in claim 1, wherein the memory stores additional instructions which, when processed by the one or more processors causes storing the particular internal correlation key value into an internal work area in the memory and generating the particular external correlation key value that uniquely represents the particular internal correlation key value.

6. An apparatus as recited in claim 1, wherein each formula in the table specifies, for an associated context value, one or more fields in the alarm message, a concatenation of which yields the particular internal correlation key value.

7. An apparatus as recited in claim 1, wherein each formula in the table specifies one or more pattern matching procedures to extract one or more fields from the alarm message, a concatenation of which yields the particular internal correlation key value.

8. An apparatus as recited in claim 1, wherein each formula in the table specifies, for an associated context value, one or more ordinal positions of fields in the alarm message and one or more references to objects in an external database system.

9. An apparatus as recited in claim 1, wherein each formula in the table specifies, for an associated context value, one or more ordinal positions of fields in the alarm message and one or more references to programmatic procedures that are stored in an external database system.

10. An apparatus as recited in claim 1, wherein each formula in the table specifies, for an associated context value, one or more ordinal positions of fields in the alarm message and one or more references to programmatic procedures that are stored in an external database system, and wherein a concatenation of the fields and a result value from execution of the programmatic procedures yields the particular internal correlation key value.

11. An apparatus as recited in claim 1, wherein generating the particular external correlation key value includes compressing the particular internal correlation key value such that the particular external correlation key value is stored in fewer bits than the particular internal correlation key value.

12. An apparatus as recited in claim 1, wherein the table is stored at a gateway that is logically located in the telecommunication network between the network element or system element, and an Operational Support System of a telecommunications service provider; wherein each formula in the table specifies, for an associated context value, one or more ordinal positions of fields in the alarm message and one or more references to objects in an external database system that is accessible to the gateway; and wherein a concatenation of the fields and objects yields the particular internal correlation key value; and wherein the apparatus is further configured to compress the particular internal correlation key value such that the particular external correlation key value is stored in fewer bits than the particular internal correlation key value.

13. An apparatus as recited in claim 1, wherein the memory stores additional instructions which, when processed by the one or more processors, causes:
storing the particular internal correlation key value and particular external correlation key value in a persistent work area; and
retrieving the particular external correlation key value from the persistent work area.

14. An apparatus as recited in claim 1, wherein sending the data that represents the alarm message and the particular external correlation key value comprises sending an SNMP message to an Operational Support System that includes a complete SNMP object carrying the data that represents the alarm message and the particular external correlation key value in an SNMP field.

15. An apparatus as recited in claim 1, wherein sending the data that represents the alarm message and the particular external correlation key value comprises sending an XML file to an Operational Support System that includes the data that represents the alarm message and the particular external correlation key value identified by unique XML tags.

16. A method for generating an external correlation key value for use in correlating alarms emitted by network elements or system elements in a telecommunications network, the method comprising:
receiving an alarm message generated by a network element or system element of the telecommunications network, wherein the alarm message is generated in response to one or more alarm conditions;
parsing the alarm message that is generated in response to the one or more alarm conditions to identify a particular context value in the alarm message;
after receiving and parsing the alarm message, using the particular context value in the alarm message as a key to retrieve from a table that associates context values to internal correlation key value formulas, a particular internal correlation key value formula specifying how to generate, by using two or more values contained in the alarm message, an internal correlation key value for the alarm message;
after receiving and parsing the alarm message, using the particular internal correlation key value formula to generate, using information contained in the alarm message, a particular internal correlation key value for the alarm message;
generating a particular external correlation key for the alarm message value based on the particular internal correlation key value; and
sending both (a) data that represents the alarm message and (b) the particular external correlation key value to a network management system, wherein the external correlation key value allows the alarm message to be properly correlated;
wherein the method is performed by one or more computing devices.

17. A method as recited in claim 16, wherein the alarm message is an SNMP message, the context value is an SNMP context string, and the external correlation key value is an ordinal number.

18. A method as recited in claim 16, wherein the formula specifies, for an associated context value, one or more fields in the alarm message, a concatenation of which yields the particular internal correlation key value.

19. A method as recited in claim 16, wherein sending the data that represents the alarm message and the particular external correlation key value comprises sending an SNMP message to an Operational Support System that includes a complete SNMP object carrying the data that represents the alarm message and the particular external correlation key value in an SNMP field.

20. A method as recited in claim 16, wherein sending the data that represents the alarm message and the particular external correlation key value comprises sending an XML file to an Operational Support System that includes the data that represents the alarm message and the particular external correlation key value identified by unique XML tags.

21. A non-transitory computer-readable medium for generating an external correlation key value for use in correlating alarms emitted by network elements or system elements in a telecommunications network, the computer-readable volatile or non-volatile storage medium storing instructions which, when processed by one or more processors, cause:
receiving an alarm message generated by a network element or system element of the telecommunications network, wherein the alarm message is generated in response to one or more alarm conditions;
parsing the alarm message that is generated in response to the one or more alarm conditions to identify a particular context value in the alarm message;
after receiving and parsing the alarm message, using the particular context value in the alarm message as a key to retrieve, from a table that associates context values to internal correlation key value formulas, a particular internal correlation key value formula specifying how to generate, by using two or more values contained in the alarm message, an internal correlation key value for the alarm message;
after receiving and parsing the alarm message, using the particular internal correlation key value formula to generate, using information contained in the alarm message, a particular internal correlation key value for the alarm message; and
sending both (a) data that represents the alarm message and (b) the particular external correlation key value to a network management system, wherein the external correlation key value allows the alarm message to be properly correlated.

22. A non-transitory computer-readable medium as recited in claim 21, wherein the alarm message is an SNMP message, the context value is an SNMP context string, and the particular external correlation key value is an ordinal number.

23. A non-transitory computer-readable medium as recited in claim 21, wherein the formula specifies, for an associated context value, one or more fields in the alarm message, a concatenation of which yields the particular internal correlation key value.

24. A non-transitory computer-readable medium as recited in claim 21, wherein sending the data that represents the alarm message and the particular external correlation key value comprises sending an SNMP message to an Operational Support System that includes a complete SNMP object carrying the data that represents the alarm message and the particular external correlation key value in an SNMP field.

25. A non-transitory computer-readable medium as recited in claim 21, wherein sending the data that represents the alarm message and the particular external correlation key value comprises sending an XML file to an Operational Support System that includes the data that represents the alarm message and the particular external correlation key value identified by unique XML tags.

26. An apparatus for generating an external correlation key value for use in correlating alarms emitted by network elements or system elements in a telecommunications network, the apparatus comprising:
  a receiver for receiving an alarm message generated by a network element or system element of the telecommunications network, wherein the alarm message is generated in response to one or more alarm conditions;
  a parser for parsing the alarm message that is generated in response to the one or more alarm conditions to identify a particular context value in the alarm message;
  a comparer for using, after receiving and parsing the alarm message, the particular context value in the alarm message as a key to retrieve from a table that associates context values to internal correlation key value formulas, a particular internal correlation key value formula specifying how to generate, by using two or more values contained in the alarm message, an internal correlation key value for the alarm message;
  an internal key generator for using, after receiving and parsing the alarm message, the particular internal correlation key value formula to generate, using information contained in the alarm message, a particular internal correlation key value for the alarm message;
  an external key generator for generating a particular external correlation key for the alarm message value based on the particular internal correlation key value; and
  a communicator for sending both (a) data that represents the alarm message and (b) the particular external correlation key value to a network management system, wherein the external correlation key value allows the alarm message to be properly correlated.

27. An apparatus as recited in claim 26, wherein the alarm message is an SNMP message, the context value is an SNMP context string, and the particular external correlation key value is an ordinal number.

28. An apparatus as recited in claim 26, wherein the formula specifies, for an associated context value, one or more fields in the alarm message, a concatenation of which yields the particular internal correlation key value.

29. An apparatus as recited in claim 26, wherein sending the data that represents the alarm message and the particular external correlation key value comprises sending an SNMP message to an Operational Support System that includes a complete SNMP object carrying the data that represents the alarm message and the particular external correlation key value in an SNMP field.

30. An apparatus as recited in claim 26, wherein sending the data that represents the alarm message and the particular external correlation key value comprises sending an XML file to an Operational Support System that includes the data that represents the alarm message and the particular external correlation key value identified by unique XML tags.

* * * * *